Sept. 6, 1938.　　　　H. R. DAVIS　　　　2,129,201

HARNESS LIFTING TOP FOR LOOMS

Filed Aug. 27, 1936

Inventor

Henry R. Davis.

By Emery, Booth, Holcombe & Miller his Attorneys

Patented Sept. 6, 1938

2,129,201

UNITED STATES PATENT OFFICE 2,129,201

HARNESS LIFTING TOP FOR LOOMS

Henry R. Davis, Augusta, Ga.

Application August 27, 1936, Serial No. 98,245

4 Claims. (Cl. 139—89)

This invention relates to looms of the type that have a plurality of harness frames suspended from shives or arms pivotally mounted on the top bars of the arch, and which are positively moved in one direction by power actuated means and are returned to normal position by springs. My invention is in the harness frame supporting and returning means, and is termed by me a duplex harness lifting top or spring jack.

The invention aims to improve the construction and operation of harness lifting tops with a view to providing a simple, strong and easily operated spring actuated support for each harness frame that is not subject to the usual friction and wear, and that can be applied as a unitary assemblage to existing looms.

Looms of the type wherein the harness frames are moved positively in one direction by cam actuated treadles usually require heavy springs and long straps running over pulleys or shives for returning the harness to normal position, and one of the objects of my invention is to do away with these shives and shorten the length of the straps by a direct means of support mounted on the arch bar of the loom.

Other objects are to provide for easy adjustment and repair of the arms, springs and straps, and for ready removal and replacement of the harness frames when changes are being made in the loom.

Figure 1:
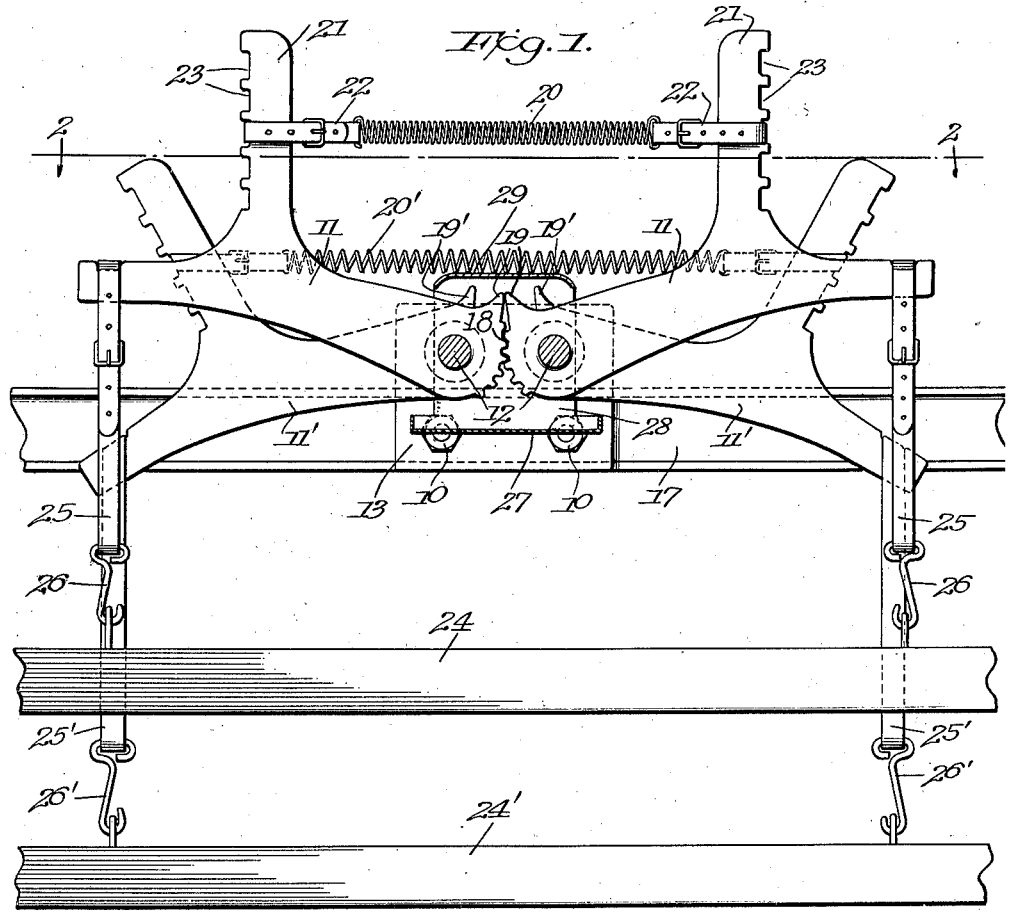
Figure 2:
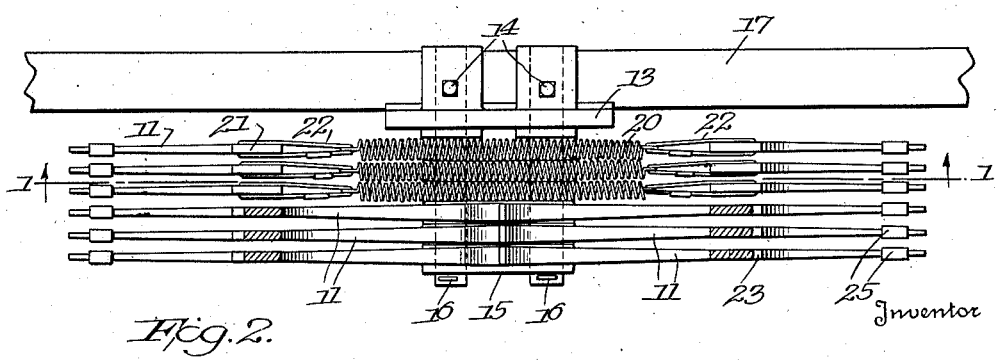

Further objects and advantages of the invention appear in connection with the following description of a preferred form of lifting top illustrated in the accompanying drawing, wherein Fig. 1 is a front view of a part of a loom equipped with my invention, showing pivot shafts and dust and drip pan in cross-section on the line 1—1 in Fig. 2; and Fig. 2 is a plan view of the same, with the dust and drip pan removed, the upper branches of three of the lifting arms being shown in cross-section on the line 2—2 in Fig. 1 to disclose the parts beneath.

In the form of invention shown in the drawing, there are six pairs of jack arms 11, 11', one pair for each harness frame, pivotally mounted side by side on two shafts 12, one arm of each pair being on one shaft and the other arm on the other shaft. The shafts are each secured at the rear in a double bracket 13 by set screws 14 (see Fig. 2) and the jack arms are removably held in place on the shafts by a plate 15 secured on the front ends of the shafts by cotter pins 16 or other suitable means. The bracket 13 is bolted on the top arch bar 17 or frame member of the loom.

The arms of each pair are connected to swing up and down together by means of gear sectors 18 which interengage in the space between the shafts 12, and are provided with stops 19, 19', to limit their upward movement. Springs 20, 20', connected to upright branches 21 on the respective arms of each pair by means of adjustable straps 22, normally hold the jack arms in their uppermost positions. The straps have loops which encircle the branches and are retained in adjusted position by notches 23 spaced along each branch to give more or less leverage to the springs as may be desired to compensate for the weight of the harness frames and harness.

The harness frames 24, 24', are suspended from the outer ends of the jack arms 11, 11', by means of adjustable stirrrups 25, 25', and hooks 26, 26', as shown in Fig. 1, the harness frames 24' being shown in depressed position, although the cam and treadle mechanism for pulling them down is not shown, this being of conventional design.

A removable oil pan 27 is suspended from the shafts 12 by means of upwardly extending end walls 28 which have spaced openings to fit over the shafts, and a cover 29 is fitted over the pan to embrace the end walls and prevent dust and lint from settling on the gears and shafts and getting between the arms. The cover also prevents the springs 20 from fouling the limit stops 19 when the pairs of arms are depressed.

When the harness is pulled up in its normal position, the springs 20 hold the arms 11 against their stops 19, and the harness frames 24 are held in horizontal position as shown in Fig. 2, and when the loom treadles are depressed to pull the harness down, the springs flex and permit the arms and harness frames to move, and the gears cause the arms to move uniformly and hold the harness even during its movement in both directions.

The invention has the advantage of reducing the size of springs and the weight of the spring supported parts as compared with existing forms of spring tops, thereby permitting lighter springs to be used and reducing the wear on the pivot shafts and arm bearings.

Furthermore, the simplicity and accessibility of the parts, combined with the light springs, makes it possible for one man to hook and unhook the harness frames in order to adjust or change the harness without difficulty. For adjusting warps, mending breakouts and pickouts, the loom fixer can readily level the harness by pressing down such of the arms 11 as may be in their normal raised position, and inserting a suitable block, such as a tool handle or bobbin, for example, between the stops 19 to hold them apart against the pull of the springs 20, thereby enabling the warp to be tied in or the break or fault remedied without changing the setting of the straps 25, and saving time in making the adjustment or repair and in starting off.

Furthermore, the harness is securely held in place without being under great tension, so that it is more easily moved about, and in case of breakage of a part of the harness or its supporting gear it is not so apt to fly up and damage the warp as in present designs. The short straps and direct connections assist in maintaining the harness in its proper position and prevent it from slatting about during the operation of the loom, thereby reducing the strain and wear on the harness, and are always within easy reach of the loom fixer when the harness is unhooked.

Other advantages of the invention are in the saving in wear on the fulcrums and parts of the harness operating mechanism due to the reduced friction, and the saving in power and reduction of noise.

The form of the invention illustrated is adapted for attachment to existing types of looms by merely drilling two holes in the arch bar to receive the bolts 10 which secure the bracket 13 in place, as the bracket supports all of the operating parts clear of the loom frame.

The invention is not restricted to the details of construction of the illustrative design, but what is claimed is as follows:

1. A unitary spring jack assemblage for looms comprising a bracket adapted to be secured to the arch, a pair of shafts mounted in said bracket to project forward over the loom harness, and pairs of arms pivotally mounted on said shafts, the arms of each pair being provided with interengaging gears to cause them to move in unison, said arms being provided with upstanding branches and outwardly extending harness frame supports, tension springs connecting the branches of each pair of arms, limit stops adjacent said gears for holding said arms in predetermined position against the pressure of said springs, and an oil pan and guard carried by said bracket, said oil pan having flanges at its ends provided with openings registering with said shafts for supporting the same in juxtaposition to said interengaging gears and pivot bearings, and said guard being readily removable to give access to said gears and stops.

2. A unitary spring jack assemblage for looms comprising a bracket adapted to be secured to the arch, a pair of shafts mounted in said bracket to project forward over the loom harness, and pairs of arms pivotally mounted on said shafts, the arms of each pair being provided with interengaging means to cause them to move in unison, an oil pan having upturned flanges at its ends each provided with openings registering with said shafts for supporting the same in juxtaposition to said pivot bearings, and a cover guard supported on said flanges and readily removable to give access to said bearings and interengaging means.

3. In combination with a spring jack for looms having a pair of parallel supporting shafts projecting forward from the arch bar and jack arms pivotally mounted thereon, an oil pan suspended beneath said jack arms having open sides and upwardly extending flanges on its front and back ends, each of said flanges being provided with spaced openings to receive said shafts whereby said oil pan is removably supported by said shafts, and a cover for said oil pan mounted on the top edges of said flanges to overlie said jack arms.

4. A unitary spring jack assemblage for looms comprising a bracket, parallel shafts mounted therein at one end and each having its other end free, pairs of jack arms pivotally mounted on said shafts and geared together at their inner ends to cause their outer ends to swing up and down in unison, springs each connecting one pair of jack arms tending to lift their outer ends, limit stops carried by each pair of jack arms, said stops mutually engaging in the uppermost position of said arms to hold them against the pressure of said springs, and a removable guard for protecting said gears and stops from above, said guard having supporting means mounted on said unitary assemblage to position it beneath said springs.

HENRY R. DAVIS.